United States Patent
Vasseur et al.

(10) Patent No.: US 8,072,879 B2
(45) Date of Patent: Dec. 6, 2011

(54) TECHNIQUE FOR DETERMINING WHETHER TO REESTABLISH FAST REROUTED PRIMARY TUNNELS BASED ON BACKUP TUNNEL PATH QUALITY FEEDBACK

(75) Inventors: Jean-Philippe Vasseur, Dunstable, MA (US); Alton Lo, Fremont, CA (US); Anna Charny, Sudbury, MA (US)

(73) Assignee: Cisco Technology, Inc., San Jose, CA (US)

(*) Notice: Subject to any disclaimer, the term of this patent is extended or adjusted under 35 U.S.C. 154(b) by 868 days.

(21) Appl. No.: 11/347,781

(22) Filed: Feb. 3, 2006

(65) Prior Publication Data
US 2007/0183317 A1    Aug. 9, 2007

(51) Int. Cl.
*H04J 1/16* (2006.01)
(52) U.S. Cl. .......................................... 370/225; 370/248
(58) Field of Classification Search ................... 370/216, 370/225, 229, 235, 238, 217, 218, 221, 395.21, 370/395.32, 219, 226, 227, 228, 241, 248; 379/219, 220.01, 221.01, 221.03; 709/238, 709/239; 714/100, 1, 2, 3, 4; 398/1, 2, 3, 398/4, 5
See application file for complete search history.

(56) References Cited

U.S. PATENT DOCUMENTS

| | | | | |
|---|---|---|---|---|
| 5,912,877 A * | 6/1999 | Shirai et al. | ................... | 370/228 |
| 6,154,444 A * | 11/2000 | Masuo et al. | ................... | 370/225 |
| 6,560,654 B1 * | 5/2003 | Fedyk et al. | ................... | 709/239 |
| 6,628,649 B1 | 9/2003 | Raj et al. | | |
| 6,751,190 B1 | 6/2004 | Swallow | | |
| 6,778,492 B2 | 8/2004 | Charny et al. | | |
| 6,831,898 B1 | 12/2004 | Edsall et al. | | |
| 6,850,486 B2 | 2/2005 | Saleh et al. | | |
| 6,895,441 B1 * | 5/2005 | Shabtay et al. | ................ | 709/238 |
| 6,978,394 B1 | 12/2005 | Charny et al. | | |
| 7,406,032 B2 * | 7/2008 | Li et al. | ......................... | 370/217 |
| 7,489,695 B1 * | 2/2009 | Ayyangar | ..................... | 370/396 |
| 2003/0037276 A1 * | 2/2003 | Mo et al. | ............................ | 714/4 |
| 2003/0090995 A1 * | 5/2003 | Illikkal et al. | ................. | 370/222 |
| 2003/0126287 A1 | 7/2003 | Charny et al. | | |
| 2003/0233595 A1 | 12/2003 | Charny et al. | | |
| 2004/0008687 A1 * | 1/2004 | Matsubara | ............... | 370/395.21 |
| 2004/0090913 A1 | 5/2004 | Scudder et al. | | |

(Continued)

OTHER PUBLICATIONS

NPL Inter-AS MPLS IETF Draft dated Jun. 2003 pp. 1-33. t.*

(Continued)

*Primary Examiner* — Kwang B Yao
*Assistant Examiner* — Obaidul Huq
(74) *Attorney, Agent, or Firm* — Cesari and McKenna, LLP

(57) ABSTRACT

A technique dynamically determines whether to reestablish a Fast Rerouted primary tunnel based on path quality feedback of a utilized backup tunnel in a computer network. According to the novel technique, a head-end node establishes a primary tunnel to a destination, and a point of local repair (PLR) node along the primary tunnel establishes a backup tunnel around one or more protected network elements of the primary tunnel, e.g., for Fast Reroute protection. Once one of the protected network elements fail, the PLR node "Fast Reroutes," i.e., diverts, the traffic received on the primary tunnel onto the backup tunnel, and sends notification of backup tunnel path quality (e.g., with one or more metrics) to the head-end node. The head-end node then analyzes the path quality metrics of the backup tunnel to determine whether to utilize the backup tunnel or reestablish a new primary tunnel.

36 Claims, 8 Drawing Sheets

U.S. PATENT DOCUMENTS

| | | | |
|---|---|---|---|
| 2004/0196827 A1 | 10/2004 | Xu et al. | |
| 2005/0083928 A1 | 4/2005 | Sivabalan et al. | |
| 2005/0097219 A1 | 5/2005 | Goguen et al. | |
| 2005/0157697 A1* | 7/2005 | Lee et al. | 370/349 |
| 2005/0185632 A1* | 8/2005 | Draves et al. | 370/351 |
| 2005/0213508 A1 | 9/2005 | Gerstel | |
| 2005/0281192 A1 | 12/2005 | Nadeau et al. | |
| 2006/0013126 A1* | 1/2006 | Yasuoka et al. | 370/217 |
| 2007/0011284 A1* | 1/2007 | Le Roux et al. | 709/223 |
| 2007/0036073 A1* | 2/2007 | Yamada et al. | 370/225 |

OTHER PUBLICATIONS

Rekhter, Y. et al., RFC 1771, "A Border Gateway Protocol 4 (BGP-4)", Network Working Group, Mar. 1995, pp. 1-54.

Moy, J., RFC 2328, entitled OSPF Version 2, Apr. 1998, pp. 1-83.

Callon, R., RFC 1195, entitled Use of OSI ISIS for routing in TCP/IP and Dual Environments, Dec. 1990, pp. 1-80.

Awduche, D., RFC 3209, entitled RSVP-TE: Extensions to RSVP for LSP Tunnels, Dec. 2001, pp. 1-57.

Smit, H., RFC 3784, entitled Intermediate-System-to-Intermediate-System (IS-IS) Extensions for Traffic Engineering (TE), Jun. 2004, pp. 1-13.

Katz, at al., RFC 3630, entitled Traffic Engineering (TE) Extensions to OSPF Version 2, Sep. 2003, pp. 1-14.

Pan, et al., RFC 4090, entitled Fast Reroute Extensions to RSVP-TE for LSP Tunnels, May 2005, pp. 1-36.

Braden, R. et al., RFC 2205, entitled Resource ReSerVation Protocol (RSVP), Version 1 Functional Specification, Sep. 1997, pp. 1-105.

Berger, L., RFC 3473, entitled Generalized Multi-Protocol Label Switching (GMPLS) Signaling Resource ReserVation Protocol-Traffic Engineering (RSVP-TE) Extensions, Jan. 2003, pp. 1-40.

Mannie, E., RFC 3945, entitled Generalized Multi-Protocol Label Switching (GMPLS) Architecture, Oct. 2004, pp. 1-65.

Mannie, E., RFC 3946, entitled Generalized Multi-Protocol Label Switching (GMPLS) Extensions for Synchronous Optical Network (SONET) and Synchronous Digital Hierarchy (SDH) Control, Oct. 2004, pp. 1-25.

Vasseur, et al., Network Working Group Internet Draft, entitled Path Computation Element (PCE) Communication Protocol (PCEP)—Version 1 (draft-vasseur-pce-pcep-02.txt), Sep. 2005, pp. 1-46.

Farrel, et al., Network Working Group Internet Draft, entitled Encoding Attributes for Multiprotocol Label Switching (MPLS) Label Switched Path (LSP) Establishment Using RSVP-TE (draft-ietf-mpls-rsvpte-attributes-05.txt), May 2005, pp. 1-19.

* cited by examiner

TECHNIQUE FOR DETERMINING WHETHER TO REESTABLISH FAST REROUTED PRIMARY TUNNELS BASED ON BACKUP TUNNEL PATH QUALITY FEEDBACK

BACKGROUND OF THE INVENTION

1. Field of the Invention

The present invention relates to computer networks and more particularly to dynamically determining whether to reestablish a Fast Rerouted primary tunnel based on path quality feedback of a utilized backup tunnel in a computer network.

2. Background Information

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS or an area is generally referred to as a "domain," and a router that interconnects different domains together is generally referred to as a "border router."

An example of an interdomain routing protocol is the Border Gateway Protocol version 4 (BGP), which performs routing between domains (ASes) by exchanging routing and reachability information among neighboring interdomain routers of the systems. An adjacency is a relationship formed between selected neighboring (peer) routers for the purpose of exchanging routing information messages and abstracting the network topology. The routing information exchanged by BGP peer routers typically includes destination address prefixes, i.e., the portions of destination addresses used by the routing protocol to render routing ("next hop") decisions. Examples of such destination addresses include IP version 4 (IPv4) and version 6 (IPv6) addresses. BGP generally operates over a reliable transport protocol, such as TCP, to establish a TCP connection/session. The BGP protocol is well known and generally described in Request for Comments (RFC) 1771, entitled *A Border Gateway Protocol 4 (BGP-4)*, published March 1995.

Examples of an intradomain routing protocol, or an interior gateway protocol (IGP), are the Open Shortest Path First (OSPF) routing protocol and the Intermediate-System-to-Intermediate-System (IS-IS) routing protocol. The OSPF and IS-IS protocols are based on link-state technology and, therefore, are commonly referred to as link-state routing protocols. Link-state protocols define the manner with which routing information and network-topology information are exchanged and processed in a domain. This information is generally directed to an intradomain router's local state (e.g., the router's usable interfaces and reachable neighbors or adjacencies). The OSPF protocol is described in RFC 2328, entitled *OSPF Version 2*, dated April 1998 and the IS-IS protocol used in the context of IP is described in RFC 1195, entitled *Use of OSI IS-IS for routing in TCP/IP and Dual Environments*, dated December 1990, both of which are hereby incorporated by reference.

An intermediate network node often stores its routing information in a routing table maintained and managed by a routing information base (RIB). The routing table is a searchable data structure in which network addresses are mapped to their associated routing information. However, those skilled in the art will understand that the routing table need not be organized as a table, and alternatively may be another type of searchable data structure. Although the intermediate network node's routing table may be configured with a predetermined set of routing information, the node also may dynamically acquire ("learn") network routing information as it sends and receives data packets. When a packet is received at the intermediate network node, the packet's destination address (e.g., stored in a header of the packet) may be used to identify a routing table entry containing routing information associated with the received packet. Among other things, the packet's routing information indicates the packet's next-hop address.

To ensure that its routing table contains up-to-date routing information, the intermediate network node may cooperate with other intermediate nodes to disseminate routing information representative of the current network topology. For example, suppose the intermediate network node detects that one of its neighboring nodes (i.e., adjacent network nodes) becomes unavailable, e.g., due to a link failure or the neighboring node going "off-line," etc. In this situation, the intermediate network node can update the routing information stored in its routing table to ensure that data packets are not routed to the unavailable network node. Furthermore, the intermediate node also may communicate this change in network topology to the other intermediate network nodes so they, too, can update their local routing tables and bypass the unavailable node. In this manner, each of the intermediate network nodes becomes "aware" of the change in topology.

Multi-Protocol Label Switching (MPLS) Traffic Engineering has been developed to meet data networking requirements such as guaranteed available bandwidth or fast restoration. MPLS Traffic Engineering exploits modem label switching techniques to build guaranteed bandwidth end-to-end tunnels through an IP/MPLS network of label switched routers (LSRs). These tunnels are a type of label switched path (LSP) and thus are generally referred to as MPLS Traffic Engineering (TE) LSPs. Examples of MPLS TE can be found in RFC 3209, entitled *RSVP-TE: Extensions to RSVP for LSP Tunnels* dated December 2001, RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version* 2 dated September 2003, the contents of all of which are hereby incorporated by reference in their entirety.

Establishment of an MPLS TE-LSP from a head-end LSR to a tail-end LSR involves computation of a path through a network of LSRs. Optimally, the computed path is the "shortest" path, as measured in some metric, that satisfies all relevant LSP Traffic Engineering constraints such as e.g., required bandwidth, "affinities" (administrative constraints to avoid or include certain links), etc. Path computation can either be performed by the head-end LSR or by some other entity operating as a path computation element (PCE) not co-located on the head-end LSR. The head-end LSR (or a PCE) exploits its knowledge of network topology and resources available on each link to perform the path computation according to the LSP Traffic Engineering constraints. Various path computation methodologies are available including CSPF (constrained shortest path first). MPLS TE-LSPs can be configured within a single domain, e.g., area, level, or AS, or may also span multiple domains, e.g., areas, levels, or ASes.

The PCE is an entity having the capability to compute paths between any nodes of which the PCE is aware in an AS or area. PCEs are especially useful in that they are more cognizant of network traffic and path selection within their AS or area, and thus may be used for more optimal path computation. A head-end LSR may further operate as a path computation client (PCC) configured to send a path computation request to the PCE, and receive a response with the computed path, potentially taking into consideration other path computation requests from other PCCs. It is important to note that when one PCE sends a request to another PCE, it acts as a PCC.

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource ReSerVation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. RSVP is defined in R. Braden, et al., *Resource ReSerVation Protocol (RSVP)*, RFC 2205, the contents of which are hereby incorporated by reference in its entirety. In the case of traffic engineering applications, RSVP signaling (with Traffic Engineering extensions) is used to establish a TE-LSP and to convey various TE-LSP attributes to routers, such as border routers, along the TE-LSP obeying the set of required constraints whose path may have been computed by various means.

Generally, a tunnel is a logical structure that encapsulates a packet (a header and data) of one protocol inside a data field of another protocol packet with a new header. In this manner, the encapsulated data may be transmitted through networks that it would otherwise not be capable of traversing. More importantly, a tunnel creates a transparent virtual network link between two network nodes that is generally unaffected by physical network links or devices (i.e., the physical network links or devices merely forward the encapsulated packet based on the new header). While one example of a tunnel is an MPLS TE-LSP, other known tunneling methods include, inter alia, the Layer Two Tunnel Protocol (L2TP), the Point-to-Point Tunneling Protocol (PPTP), and IP tunnels.

Occasionally, a network element (e.g., a node or link) will fail, causing redirection of the traffic that originally traversed the failed network element to other network elements that bypass the failure. Generally, notice of this failure is relayed to the nodes in the network through an advertisement of the new network topology, e.g., an IGP or BGP Advertisement, and routing tables are updated to avoid the failure accordingly. Reconfiguring a network in response to a network element failure using, e.g., pure IP rerouting, can be time consuming. Many recovery techniques, however, are available to provide fast recovery and/or network configuration in the event of a network element failure, including, inter alia, "Fast Reroute", e.g., MPLS TE Fast Reroute. An example of MPLS TE Fast Reroute is described in Pan, et al., *Fast Reroute Extensions to RSVP-TE for LSP Tunnels*, RFC 4090, May 2005, which is hereby incorporated by reference as though fully set forth herein.

Fast Reroute (or FRR) has been widely deployed to protect against network element failures, where "backup tunnels" are created to bypass one or more protected network elements (e.g., links, shared risk link groups (SRLGs), and nodes). When the network element fails, traffic is quickly diverted ("Fast Rerouted") over a backup tunnel to bypass the failed element, or more particularly, in the case of MPLS, a set of primary TE-LSPs (tunnels) is quickly diverted. Specifically, the point of local repair (PLR) node configured to reroute the traffic inserts ("pushes") a new label for the backup tunnel, and the traffic is diverted accordingly. Once the failed element is bypassed, the backup tunnel label is removed ("popped"), and the traffic is routed along the original path according to the next label (e.g., that of the original TE-LSP). Notably, the backup tunnel, in addition to bypassing the failed element along a protected primary TE-LSP, also intersects the primary TE-LSP, i.e., it begins and ends at nodes along the protected primary TE-LSP.

To offer maximum protection, e.g., guaranteed bandwidth, during Fast Reroute, backup tunnels may reserve a configurable amount of bandwidth to ensure that Fast Rerouted traffic from the primary tunnel has a reserved path to follow. For example, the bandwidth reserved for the primary tunnel may also be reserved on the backup tunnel. While this approach provides maximum protection, it also requires a non-negligible amount of network resources (e.g., capacity/bandwidth) and may increase operational complexity.

Certain techniques are available to efficiently minimize the amount of resources required by the establishment and maintenance of the backup tunnels for Fast Reroute. One such technique is to create zero-bandwidth ("0-BW") backup tunnels (i.e., tunnels that reserve no bandwidth) to protect non-0-BW primary tunnels. This "best effort" approach does not guarantee that the path followed by the backup tunnel will have enough bandwidth to support the diverted primary tunnel at the time of failure without QoS degradation, however in many situations the path quality of the backup tunnel is sufficient. For instance, if the network is not overly congested, or the backup tunnel follows a non-congested path, there may be enough available bandwidth along the backup tunnel to support the newly rerouted traffic. Also, because primary tunnels often reserve bandwidth in response to "peak" traffic utilization, the amount of traffic over the primary tunnel at the time of failure may be far less than the reserved bandwidth (e.g., at "off-peak" times). Notably, those skilled in the art will understand that in the absence of the above exceptions, a 0-BW backup tunnel may have unacceptable bandwidth (e.g., affecting path quality) to support the diverted traffic.

Currently, head-end nodes (LSRs) may be configured to systematically reroute the primary tunnels affected by the network element failure (e.g., diverted primary tunnels), especially in the case with 0-BW backup tunnels, such as, e.g., by reestablishing a new primary tunnel that follows a path excluding the failed network element. In particular, 0-BW backup tunnels represent a best effort attempt to allow the head-end node to more gracefully reestablish the primary tunnel in response to a failure, since the backup tunnels may not be able to support the diverted traffic without QoS degradation. The systematic reestablishing may potentially result in the reestablishment of a large number of primary tunnels (e.g., up to 3000 for a single network element failure in today's networks). Notably, reestablishing diverted primary tunnels may be undesirable for the network, such as by creating traffic churn, jitter, control plane overloads, etc., as will be understood by those skilled in the art. However, as noted above, there are situations where the backup tunnel may provide acceptable bandwidth, at least, for example, for a period of time (e.g., possibly short) until the failed network element is restored. In these situations, then, it may have been unnecessary to reestablish the diverted primary tunnels. There remains a need, therefore, for a technique that dynamically determines whether to reestablish a diverted primary tunnel based on path quality feedback of a utilized backup tunnel in a computer network.

SUMMARY OF THE INVENTION

The present invention is directed to a technique for dynamically determining whether to reestablish a Fast Rerouted primary tunnel based on path quality feedback of a utilized backup tunnel in a computer network. According to the novel technique, a head-end node establishes a primary tunnel to a destination, and a point of local repair (PLR) node along the primary tunnel establishes a backup tunnel around one or more protected network elements of the primary tunnel, e.g., for Fast Reroute protection. Once one of the protected network elements fail, the PLR node "Fast Reroutes," i.e., diverts, the traffic received on the primary tunnel onto the backup tunnel, and sends notification of backup tunnel path quality (e.g., with one or more metrics) to the head-end node. The head-end node then analyzes the path quality metrics of the backup tunnel to determine whether to utilize the backup tunnel or reestablish a new primary tunnel.

In the illustrative embodiment described herein, the notification of backup tunnel path quality may be embodied as extensions to a request/response signaling exchange, such as Resource ReSerVation Protocol (RSVP) Traffic Engineering (TE) signaling messages. Notably, the RSVP extensions are, in turn, embodied as new RSVP objects, flags, and/or type/length/value (TLV) encoded formats contained within the RSVP objects. For instance, a novel Fast Reroute Feedback (FFeed) sub-object may be included within an LSP-ATTRIBUTE object of the RSVP messages to convey the path quality notification.

In accordance with one aspect of the present invention, the head-end node requests the establishment of the primary tunnel (e.g., a TE-Label Switched Path, TE-LSP), along with a request for Fast Reroute protection of one or more network elements (e.g., with zero-bandwidth, 0-BW backup tunnels) at a PLR node. In addition, the head-end node may include a request for backup tunnel path quality notification, such as, e.g., through the use of the novel Feedback sub-object. The primary and backup tunnels may then be established, and, in accordance with Fast Reroute, the PLR node may monitor the protected network elements for failure. Once failure is detected, the PLR node diverts the traffic onto the backup tunnel, and sends an error message (e.g., an RSVP PathErr) to the head end node indicating the "Fast Rerouting" of the primary tunnel.

In accordance with another aspect of the present invention, prior to Fast Rerouting, the PLR node may collect metrics/statistics (e.g., packet drops, path cost, jitter, etc.) of the primary and/or backup tunnels. Once the primary tunnel is Fast Rerouted, the PLR node continues to collect metrics of the backup tunnel, and may inform the head-end node of the primary tunnel of any configurable difference (e.g., decrease) in path quality associated with utilizing the backup tunnel, i.e., in a path quality notification. Notably, the PLR node may be configured to send path quality notifications to the head-end node once, continually, periodically, in response to configurable changes in path quality, etc. Also, as in the case where multiple primary tunnels are Fast Rerouted, the path quality notification may include an indication of which Fast Rerouted primary tunnels in particular have been effected by the changed path quality.

In accordance with yet another aspect of the present invention, upon receiving the error message (PathErr), the head-end node may wait for the path quality notification (i.e., if requested) prior to determining whether to reestablish the new primary tunnel. The determination may be made based on configurable boundaries, increases, combinations, etc., of the metrics. If the metrics are acceptable, the backup tunnel remains utilized and no primary tunnel reestablishment is performed. On the other hand, if the metrics are unacceptable, the head-end node may attempt to reestablish the new primary tunnel. Notably, in the event the head-end node does not receive a path quality notification for the backup tunnel (e.g., within a configurable time limit), the head-end node may attempt to reestablish the new primary tunnel. Moreover, where the head-end node has multiple primary tunnels being Fast Rerouted, a configurable subset of the primary tunnels may be reestablished, e.g., to reduce congestion of the backup tunnels, and/or to limit the number of reestablished primary tunnels within a given period of time.

Advantageously, the novel technique dynamically determines whether to reestablish a Fast Rerouted primary tunnel based on path quality feedback of a utilized backup tunnel in a computer network. By providing the head-end node of the primary tunnel with path quality feedback of the backup tunnel, the novel technique avoids reestablishing a potentially large number of tunnels over one or more alternate paths after a failure (and Fast Reroute) if the backup tunnels have acceptable path quality. In particular, the backup tunnels, e.g., 0-BW backup tunnels, may not be congested or subsequently burdened by the Fast Rerouted traffic of the primary tunnel. Also, the failed network element (thus the primary tunnel) may be quickly restored; therefore by not reestablishing the primary tunnel, network jitter, churn, etc., may be avoided. Further, the dynamic nature of the novel technique alleviates the need for cumbersome manual configuration.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 1:
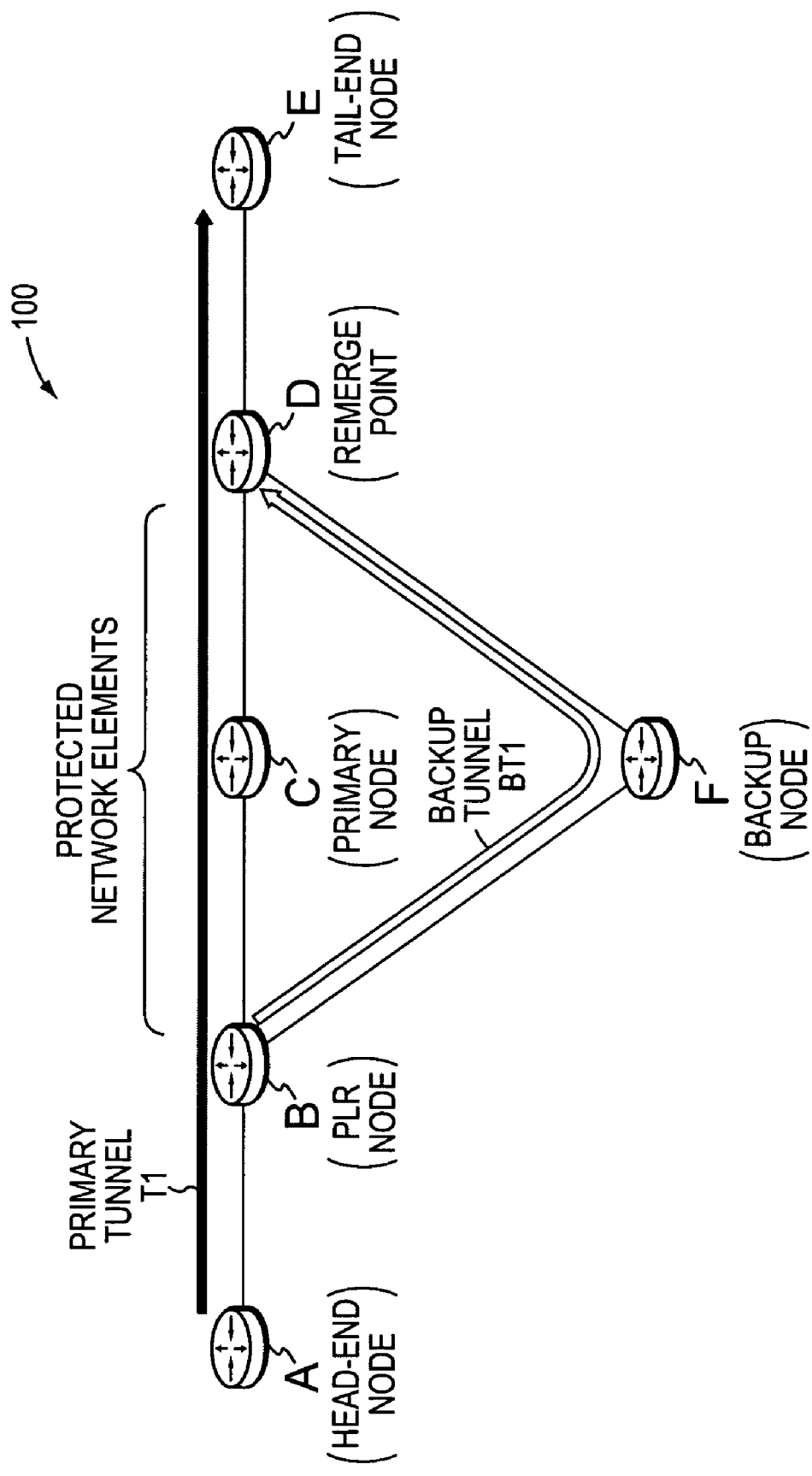
FIG. 1 is a schematic block diagram of an exemplary computer network that may be used in accordance with the present invention.

FIG. 1 is a schematic block diagram of an exemplary computer network 100 comprising a plurality of nodes A-F, such as routers or other network devices, interconnected as shown. The nodes may be a part of one or more autonomous systems, routing domains, or other networks or subnetworks. For instance, routers A and E may be provider edge (PE) devices of a provider network, (e.g., a service provider network) that are interconnected to one or more customer networks through customer edge (CE) devices (not shown, while the remaining nodes B-D and F may be core provider (P) devices, as will be understood by those skilled in the art. Those skilled in the art will also understand that the nodes A-F may be any nodes within any arrangement of computer networks, and that the view shown herein is merely an example. For example, the nodes may be configured as connections to/from one or more virtual private networks (VPNs), as will be understood by those skilled in the art. These examples are merely representative. Those skilled in the art will understand that any number of routers, nodes, links, etc. may be used in the computer network 100 and connected in a variety of ways, and that the view shown herein is for simplicity.

Data packets may be exchanged among the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing information may be distributed among the routers of the computer network using predetermined Interior Gateway Protocols (IGPs), such as conventional distance-vector protocols or, illustratively, link-state protocols, through the use of IGP Advertisements.

Figure 2:
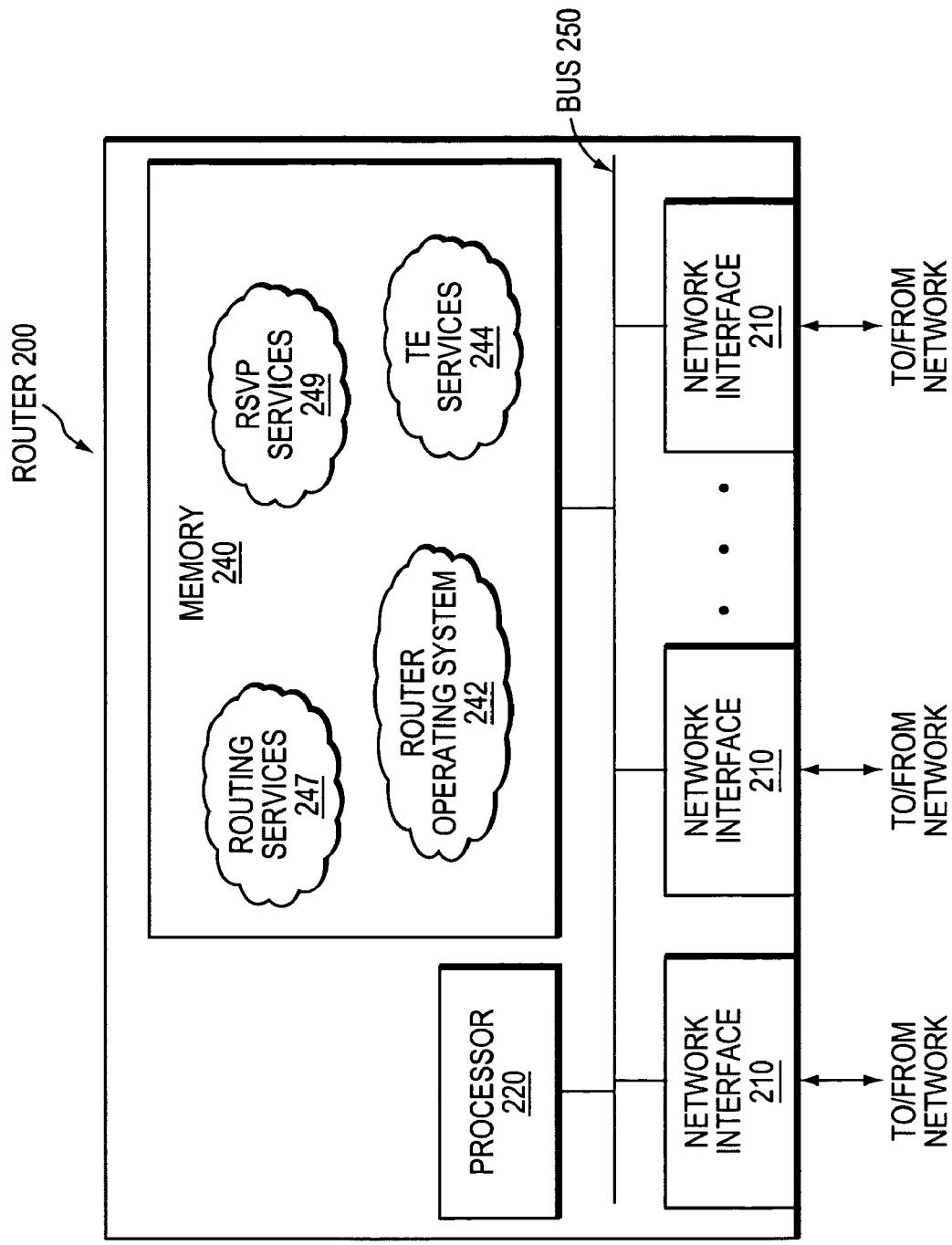
FIG. 2 is schematic block diagram of an exemplary router that may be advantageously used with the present invention.

FIG. 2 is a schematic block diagram of an exemplary router 200 that may be advantageously used with the present invention, e.g., as an edge router or a core router. The router comprises a plurality of network interfaces 210, a processor 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures. A router operating system 242 (e.g., the Internetworking Operating System, or IOS™, of Cisco Systems, Inc.), portions of which is typically resident in memory 240 and executed by the processor, functionally organizes the router by, inter alia, invoking network operations in support of software processes and/or services executing on the router. These software processes and/or services may comprise routing services 247, Traffic Engineering (TE) services 244, and RSVP services 249. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as IGP (e.g., OSPF and IS-IS), IP, BGP, etc. These functions may be configured to manage a forwarding information database (not shown) containing, e.g., data used to make forwarding decisions. Routing services 247 may also perform functions related to virtual routing protocols, such as maintaining VRF instances (not shown) as will be understood by those skilled in the art.

RSVP services 249 contain computer executable instructions for implementing RSVP and processing RSVP messages in accordance with the present invention. RSVP is described in RFC 2205, entitled *Resource ReSerVation Protocol (RSVP)*, and in RFC 3209, entitled *RSVP-TE: Extensions to RSVP for LSP Tunnels*, both as incorporated above.

TE services 244 contain computer executable instructions for operating TE functions in accordance with the present invention. Examples of Traffic Engineering are described in RFC 3209, RFC 3784, and RFC 3630 as incorporated above, and in RFC 3473, entitled, *Generalized Multi-Protocol Label Switching (GMPLS) Signaling Resource ReSerVation Protocol-Traffic Engineering (RSVP-TE) Extensions* dated January 2003, which is hereby incorporated by reference in its entirety. A TE database (TED, not shown) may be illustratively resident in memory 240 and used to store TE information provided by the routing protocols, such as IGP, BGP, and/or RSVP (with TE extensions, e.g., as described herein), including, inter alia, path quality information as described herein. The TED may be illustratively maintained and managed by TE services 244.

Changes in the network topology may be communicated among routers 200 using a link-state protocol, such as the conventional OSPF and IS-IS protocols. Suppose, for example, that a communication link fails or a cost value associated with a network node changes. Once the change in the network's state is detected by one of the routers, that router may flood an IGP Advertisement communicating the change to the other routers in the network. In this manner, each of the routers eventually "converges" to an identical view of the network topology.

In one embodiment, the routers described herein are IP routers that implement Multi-Protocol Label Switching (MPLS) and operate as label switched routers (LSRs). In one simple MPLS scenario, at an ingress to a network, a label is assigned to each incoming packet based on its forwarding equivalence class before forwarding the packet to a next-hop router. At each router, a forwarding selection and a new substitute label are determined by using the label found in the incoming packet as a reference to a label forwarding table that includes this information. At the network egress, a forwarding decision is made based on the incoming label but optionally no label is included when the packet is sent on to the next hop. In some network configurations, one hop prior to the network egress, a penultimate hop popping (PHP) operation may be performed. Particularly, because the hop prior to the network egress (the penultimate hop) is attached to the network egress, the label is no longer needed to assure that the traffic follows a particular path to the network egress. As such, the PHP-enabled device "pops" the labels from the traffic before forwarding the traffic to the network egress, e.g., using conventional or native (IP) routing, thereby alleviating the task of removing the labels at the network egress.

The paths taken by packets that traverse the network in this manner are referred to as label switched paths (LSPs) or Traffic Engineering (TE)-LSPs. An example TE-LSP is shown as the thick line and arrow (T1) between a head-end node (router A) and a tailend node (router E) in FIG. 1. Establishment of a TE-LSP requires computation of a path, signaling along the path, and modification of forwarding tables along the path. MPLS TE establishes LSPs that have guaranteed bandwidth under certain conditions. Illustratively, the TE-LSPs may be signaled through the use of the RSVP protocol (with Traffic Engineering extensions), and in particular, RSVP TE signaling messages. Notably, when incorporating the use of PCEs (described below), the path computation request (and response) between PCC and PCE can be exchanged in accordance with a protocol specified in Vasseur, et al., *Path Computation Element (PCE) Communication Protocol (PCEP)—Version 1*—<draft-vasseur-pce-pcep-02.txt>, Internet Draft, September 2005, the contents of which are hereby incorporated by reference in its entirety. It should be understood that the use of RSVP or PCEP serves only as an example, and that other communication protocols may be used in accordance with the present invention.

In accordance with RSVP, to request a data flow (TE-LSP) between a sender and a receiver, the sender may send an RSVP path request (Path) message downstream to the receiver along a path (e.g., a unicast route) to identify the sender and indicate e.g., bandwidth needed to accommodate the data flow, along with other attributes of the TE-LSP. The Path message may contain various information about the data flow including, e.g., traffic characteristics of the data flow. Also in accordance with the RSVP, a receiver establishes the TE-LSP between the sender and receiver by responding to the sender's Path message with a reservation request (Resv) message. The reservation request message travels upstream hop-by-hop along the flow from the receiver to the sender. The reservation request message contains information that is used by intermediate nodes along the flow to reserve resources for the data flow between the sender and the receiver, to confirm the attributes of the TE-LSP, and provide a TE-LSP label. If an intermediate node in the path between the sender and receiver acquires a Path message or Resv message for a new or established reservation (TE-LSP) and encounters an error (e.g., insufficient resources, failed network element, etc.), the intermediate node generates and forwards a path or reservation error (PathErr or ResvErr, hereinafter Error) message to the sender or receiver, respectively.

Figure 3:
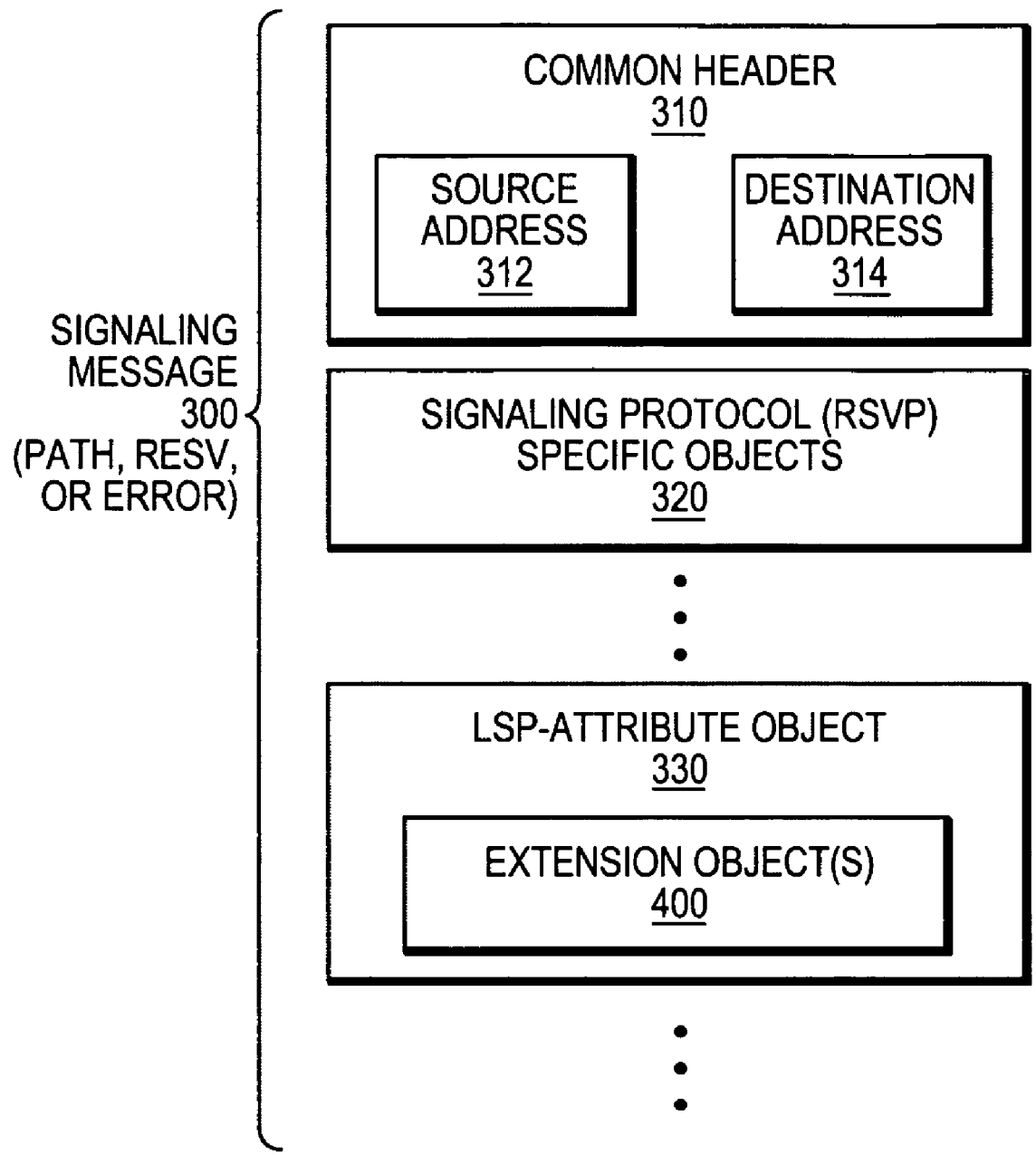
FIG. 3 is schematic block diagram of an exemplary signaling (RSVP) message that may be advantageously used with the present invention.

FIG. 3 is a schematic block diagram of portions of a signaling message 300 (e.g., RSVP message, such as Path, Resv or Error) that may be advantageously used with the present invention. Message 300 contains, inter alia, a common header 310 and one or more signaling protocol specific objects 320, such as an LSP-ATTRIBUTE object 330. The common header 310 may comprise a source address 312 and destination address 314, denoting the origination and requested termination of the message 300. Protocol specific objects 320 contain objects necessary for each type of message 300 (e.g., Path, Resv, Error, etc.). For instance, a Path message may have a sender template object, Tspec object, Previous-hop object, etc. The LSP-ATTRIBUTE object 330, for instance, may be used to signal attributes and/or information regarding an LSP (tunnel). To communicate this information, LSP-ATTRIBUTE object 330 (as well as specific objects 320) may include various type/length/value (TLV) encoding formats and/or flags, as will be understood by those skilled in the art. An example of an LSP-ATTRIBUTE object is further described in Farrel, et al., *Encoding of Attributes for Multi-protocol Label Switching (MPLS) Label Switched Path (LSP) Establishment Using RSVP-TE* <draft-ietf-mpls-rsvpte-attributes-05.txt>, Internet Draft, May 2005, which is hereby incorporated by reference as though fully set forth herein. A Resv message, on the other hand, may have specific objects 320 for a label object, session object, filter spec object, etc., in addition to the LSP-ATTRIBUTE object 330. Error messages 300 (e.g., PathErr or ResvErr), may also have specific objects 320, such as for defining the type of error, etc.

It should be noted that in accordance with RSVP signaling, the state of the TE-LSP is refreshed on a timed interval, e.g., every thirty seconds, in which RSVP Path and Resv messages are exchanged. This timed interval is configurable by a system administrator. Moreover, various methods understood by those skilled in the art may be utilized to protect against route record objects (RROs) contained in signaling messages for a TE-LSP in the event security/privacy is desired. Such RRO filtering prevents a head-end node of the TE-LSP from learning of the nodes along the TE-LSP, i.e., nodes within the provider network.

Although the illustrative embodiment described herein is directed to MPLS, it should also be noted that the present invention may advantageously apply to Generalized MPLS (GMPLS), which pertains not only to packet and cell-based networks, but also to Time Division Multiplexed (TDM) and optical networks. GMPLS is well known and described in RFC 3945, entitled *Generalized Multi-Protocol Label Switching (GMPLS) Architecture*, dated October 2004, and RFC 3946, entitled *Generalized Multi-Protocol Label Switching (GMPLS) Extensions for Synchronous Optical Network (SONET) and Synchronous Digital Hierarchy (SDH) Control*, dated October 2004, the contents of both of which are hereby incorporated by reference in their entirety.

To obviate delays associated with updating routing tables when attempting to avoid a failed network element (i.e., during convergence), some networks have employed MPLS TE Fast Reroute (FRR). MPLS Fast Reroute is a technique that may be used to quickly divert ("Fast Reroute") traffic around failed network elements in a TE-LSP. MPLS Fast Reroute is further described, for example, by *Fast Reroute Extensions to RSVP-TE for LSP Tunnels*, as incorporated by reference above. According to the technique, one or more network elements (e.g. links or nodes) in a network are protected by backup tunnels following an alternate path. If a failure occurs on a protected link or node, TE-LSPs (and consequently the traffic that they carry) are locally diverted onto an appropriate alternate path (e.g., a "backup tunnel") by the node immediately upstream from the failure. The backup tunnel acts as a Fast Reroute path for the primary TE-LSP and obviates delays associated with other measures, such as tearing down the primary TE-LSP after having gracefully diverted the TE-LSPs affected by the failure, should an alternate path around the failed network element exist. In the event of a failure of a protected element the head-end node of the backup tunnel (or a "point of local repair," PLR node) may quickly begin diverting traffic over the backup tunnel with minimal disruption to traffic flow. Those skilled in the art will understand that MPLS Fast Reroute is one example of link or node failure protection, and that other known correction mechanisms may be used in accordance with the present invention. As mentioned above, however, the head-end node of the Fast Rerouted primary tunnel may attempt to reestablish the primary tunnel in response to learning of the protected element failure, particularly in the case where the backup tunnel is a zero-bandwidth (0-BW) tunnel. The attempt to reestablish the primary tunnel has conventionally been a systematic response to Fast Rerouting (diverting) of the primary tunnel, regardless of the path quality of the backup tunnel.

The present invention is directed to a technique for dynamically determining whether to reestablish a Fast Rerouted primary tunnel based on path quality feedback of a utilized backup tunnel in a computer network. According to the novel technique, a head-end node establishes a primary tunnel to a destination, and a point of local repair (PLR) node along the primary tunnel establishes a backup tunnel around one or more protected network elements of the primary tunnel, e.g., for Fast Reroute protection. Once one of the protected network elements fail, the PLR node "Fast Reroutes," i.e., diverts, the traffic received on the primary tunnel onto the backup tunnel, and sends notification of backup tunnel path quality (e.g., with one or more metrics) to the head-end node. The head-end node then analyzes the path quality metrics of the backup tunnel to determine whether to utilize the backup tunnel or reestablish a new primary tunnel.

In the illustrative embodiment described herein, the notification of backup tunnel path quality may be embodied as extensions to a request/response signaling exchange, such as RSVP TE signaling messages. Notably, the RSVP extensions are, in turn, embodied as new RSVP objects, flags, and/or TLV encoded formats contained within the RSVP objects. For instance, a novel Fast Reroute Feedback (FFeed) sub-object may be included within an LSP-ATTRIBUTE object 330 of the RSVP messages 300 to convey the path quality notification.

The TLV encoded format is used to identify a type (T) of information being communicated (conveyed), a length (L) of information to be conveyed, and a value (V) of the actual information conveyed. The length (L) parameter contained in the length field is typically implementation-specific and can denote the length from the beginning of the Type field of the object to the end. However, the length generally denotes the length of the Value (V) field and not the Type (T) or Length (L) fields.

Figure 4:
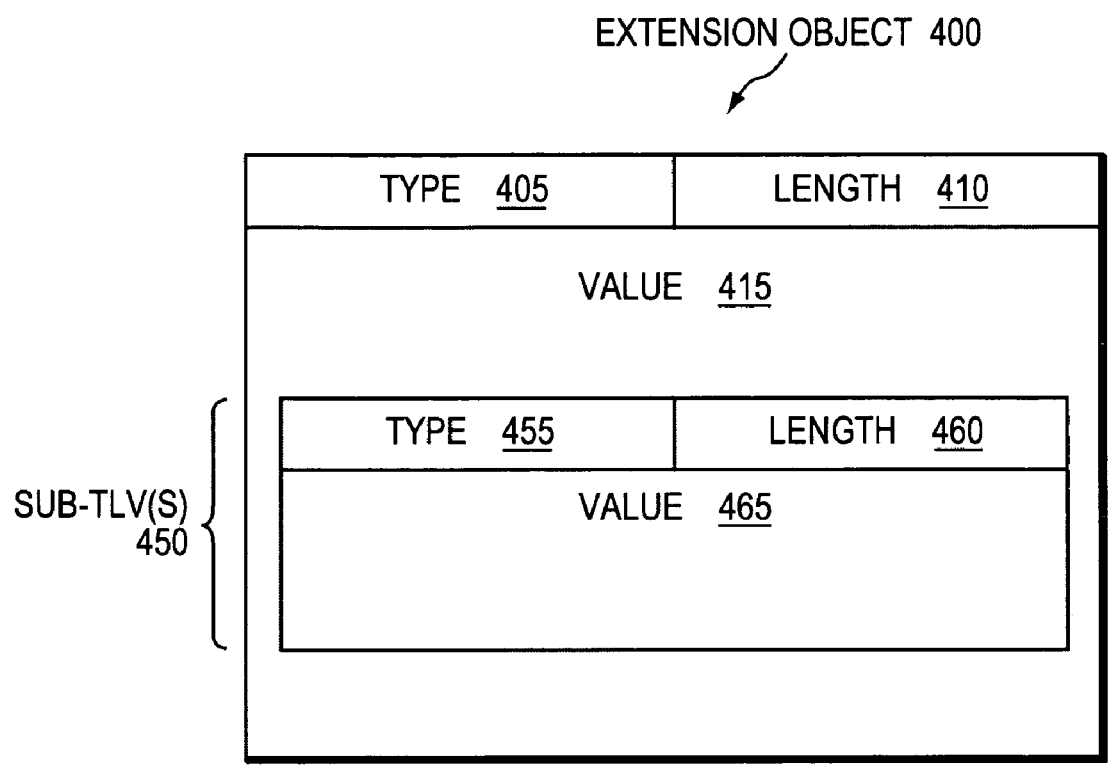
FIG. 4 is schematic block diagram of an exemplary extension (Feedback) object that may be advantageously used with the present invention.

FIG. 4 is a schematic block diagram illustrating the format of an extension object (TLV) 400, such as a Fast Reroute Feedback object, that may be advantageously used with the present invention. The extension object (or sub-object) 400 is illustratively embodied as a TLV contained in an LSP-ATTRIBUTE object 330 of an RSVP message 300 and is extended to carry backup (and/or primary) tunnel path quality information. To that end, the "Feedback" object 400 is organized to include a Type field 405 containing a predetermined type value signifying the specific content of the object 400. The Length field 410 is a variable length value. The TLV encoded format may also comprise one or more non-ordered sub-TLVs 450 carried within the TLV "payload" (e.g. Value field 415), each having a Type field 455, Length field 460, and Value field 465. The fields of the TLV 400 and sub-TLV(s) 450 are used in a variety of manners, including as described herein, according to the present invention.

In accordance with one aspect of the present invention, the head-end node (e.g., router A) requests the establishment of the primary tunnel (e.g., T1), such as a TE-LSP. Notably, the head-end node may be a head-end node for multiple primary tunnels, as will be understood by those skilled in the art. Along with the primary tunnel establishment, the head-end node may also request Fast Reroute protection of one or more network elements (e.g., all intermediate network elements) at a PLR node (e.g., router B as shown). Note that each intermediate node along the primary tunnel may act as a PLR node, and that router B is shown merely for simplicity. Illustratively, the Fast Reroute protection may be embodied as one or more zero-bandwidth (0-BW) backup tunnels at the PLR node (e.g., BT1). Those skilled in the art will also understand that the PLR node may protect more than one primary tunnel originating at more than one corresponding head-end node (not shown).

In addition, the head-end node may also request backup tunnel path quality notification to be sent from the PLR nodes. The novel request may be embodied through the use of the novel Feedback sub-object 400. For instance, the Feedback sub-object 400 may include one or more flags (not shown) requesting the information, or, more particularly, may include one or more sub-TLV objects 450, where each sub-TLV corresponds to a specific request path quality metric (described below). The request may be in the form of a predefined value within each object (TLV/sub-TLV), or as an empty object (e.g., a zero value in Value fields 415 and/or 465). Notably, the requests to establish the primary tunnel, to protect the primary tunnel, and to receive backup tunnel path quality notification may be contained within a single request (e.g., Path messages 300), or as separate requests, as will be understood by those skilled in the art.

Figure 5:
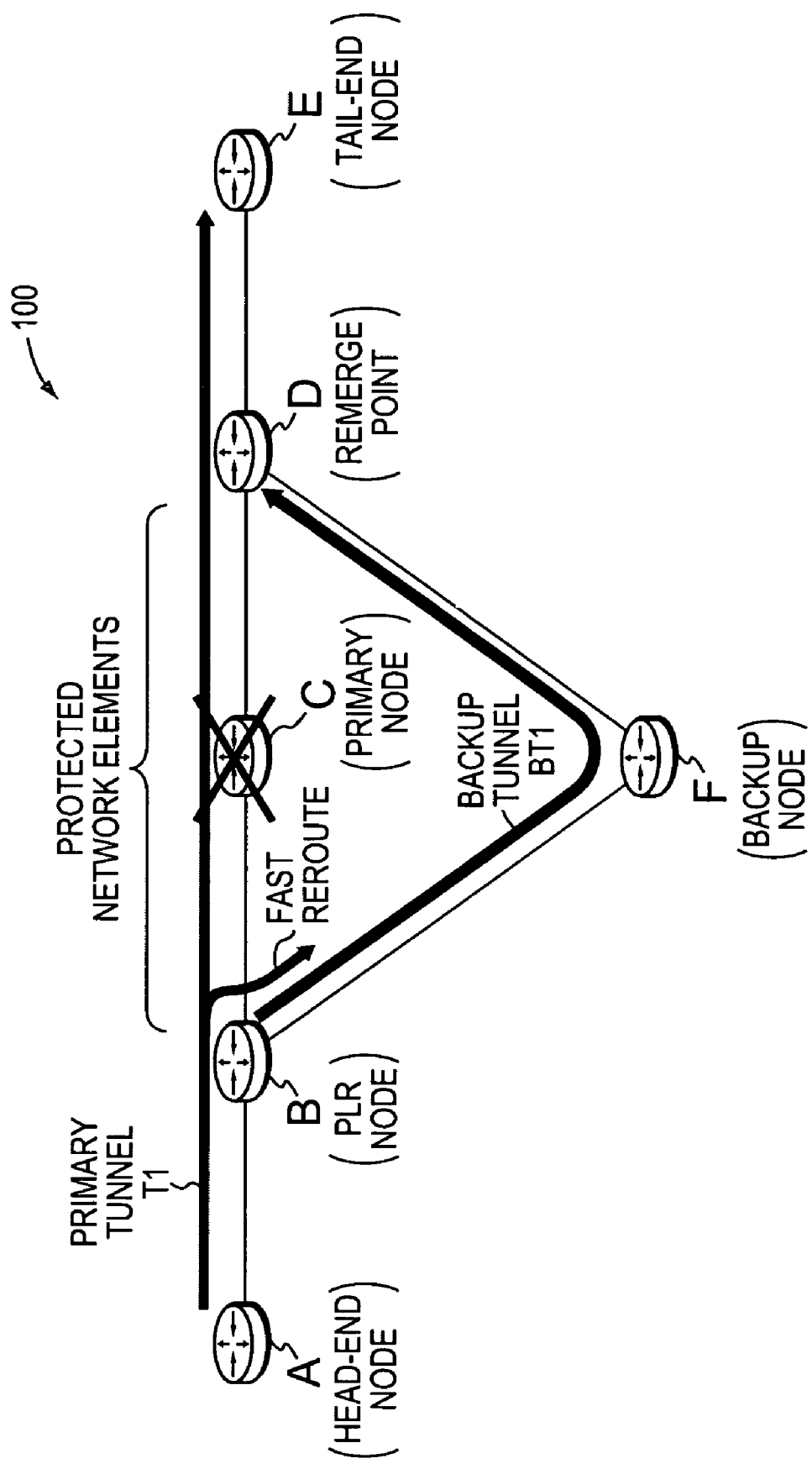
FIG. 5 is a schematic block diagram of the computer network in FIG. 1 showing Fast Reroute protection of a primary tunnel using a backup tunnel in accordance with the present invention.

The primary and backup tunnels may then be established, and, in accordance with Fast Reroute, the PLR node may monitor the protected network elements for failure. For example, various connectivity verification protocols, such as, e.g., Bidirectional Forwarding Detection (BFD), IGP "Hello" packets, BGP KEEPALIVE messages, etc., may be used to detect a failure of a network element, as will be understood by those skilled in the art. Furthermore, other lower-layer failure detection mechanisms (e.g. optical or SONET/SDH alarms) may be used to detect a network element failure. Once failure is detected, the PLR node diverts the traffic onto the backup tunnel, and may send an error message (e.g., an RSVP PathErr 300, such as a conventional "tunnel locally repaired" message) to the head end node indicating the "Fast Rerouting" of the primary tunnel. FIG. 5 is a schematic block diagram of the computer network 100 in FIG. 1 showing Fast Reroute protection of the primary tunnel T1 (e.g., in response to a protected network element, router C, failure, indicated with an overlaid "X") using a backup tunnel BT1 in accordance with the present invention. Traffic originally received at the PLR node (router B) over the primary tunnel is now diverted over the backup tunnel to a remerge point (router D) of the primary tunnel, as will be understood by those skilled in the art.

In accordance with another aspect of the present invention, prior to Fast Rerouting, each PLR node may collect metrics/ statistics of the primary and/or backup tunnels. For instance, example metrics may comprise, inter alia, packet drops, path cost, jitter, delay, bandwidth, etc. The PLR node may collect the metrics through traffic monitoring, probes, independent calculations, and/or through cooperation with protected nodes of the primary tunnel (primary nodes) and nodes of the backup tunnel (backup nodes), e.g., transmitting path quality notifications. Once the primary tunnel is Fast Rerouted (i.e., diverted after failure of a protected network element), the PLR node continues to collect metrics of the backup tunnel. (Alternatively, metrics of the backup tunnel may be collected only after Fast Reroute, and not prior to Fast Reroute.)

For example, a path cost increase from the primary tunnel to the backup tunnel may be computed (and transmitted, below) by the PLR node prior to the failure (or during the failure while the primary TE-LSP is diverted onto the backup tunnel) using its own routing tables. The path cost increase may be calculated as a difference between the entire length (head-end node to tail-end node) of the primary and backup tunnels, or just the difference between the protected segment of the primary tunnel and the backup tunnel (PLR node to remerge point). Also, a jitter increase of the primary and backup tunnels, which may be generally described as a difference between inter-arrival of packets, may be monitored using various known techniques, such as, e.g., sending probe packets (probes) from the PLR node to the remerge point. For instance, probes may determine that packets arrive at the remerge point along the primary tunnel from the PLR node consistently, e.g., every 10 milliseconds (ms) (e.g., an average value). After Fast Reroute, however, probes may determine that packets do not arrive at the remerge point along the backup tunnel from the PLR node consistently, e.g., one may arrive in 10 ms, another in 100 ms, another in 50 ms, etc. The non-constant rate of received packets (jitter) may be undesirable, e.g., in particular for voice over IP (VoIP) traffic, as will be understood by those skilled in the art.

As a further example, packet dropping may be monitored for the primary and backup tunnels prior to and after Fast Reroute (respectively). For instance, based on the tunnel label of the dropped packet, primary nodes and/or backup nodes may be able to distinguish which tunnel corresponds to the dropped packets. Each of the primary and/or backup nodes collect packet drop data, and periodically inform the PLR node of the number of dropped packets (e.g., though a corresponding Feedback object 400). In the case of a backup node, the PLR node receiving the notification may interpret the association of the backup tunnel label and the primary tunnel label to reference an appropriate primary tunnel. Those skilled in the art will understand that the above path quality metrics are merely examples, and that any other metrics/statistics useful for determining path quality of the backup tunnel may be used in accordance with the present invention (e.g., delay, bandwidth, etc.). Further, the path quality information may be measured and compared in a variety of manners, such as, e.g., as a difference between primary and backup tunnels before and after Fast Reroute, or simply the difference between the backup tunnel before and after Fast Reroute, etc.

Also after the primary tunnel is Fast Rerouted, the PLR node may inform the head-end node of the primary tunnel of any configurable difference (e.g., decrease) in path quality associated with utilizing the backup tunnel, i.e., in a path quality notification. For instance, the novel Feedback object 400 may include one or more sub-TLVs 450 corresponding to metrics/statistics, as described above. Notably, the path quality information pertaining to a particular metric/statistic may be transmitted as total values for interpretation by the head-end node (e.g., to determine the difference), or as PLR-node-computed differences (e.g., between the primary and backup tunnels, or before and after Fast Reroute). For instance, if the delay of the primary tunnel (along the protected segment) prior to Fast Reroute were 2 ms, and after Fast Reroute the delay of the backup tunnel were 5 ms, the notification may be configured to include both values 2 ms and 5 ms, or instead simply the difference, i.e., an increase of 3 ms.

The PLR node may be configured to send path quality notifications to the head-end node once, continually, periodically, in response to configurable changes in path quality, etc. For instance, the primary and backup nodes may send notifications to the PLR node continually, in addition to the PLR node's monitoring/probing/etc. other metrics. In response to a Fast Reroute, the PLR node may be configured to determine when/whether to send a summarized/averaged path quality notification to the head-end node. Such determination may be to, e.g., send the notification if the increase is greater than a certain percentage (e.g., 10%), or if the increase reaches a certain threshold (e.g., 50 dropped packets), etc. Also, the PLR node may be configured to send an initial backup tunnel path quality notification in response to Fast Reroute, and to then either send subsequent notifications in response to a periodic timer (e.g., every 30 seconds), and/or in response to a change in quality (e.g., above 15%) of the backup tunnel.

Further, as in the case where multiple primary tunnels are Fast Rerouted, the path quality notification may include an indication of which diverted primary tunnels in particular have been affected by the changed path quality. This additional information may assist the head-end node in its decision on which primary tunnels to reroute (below). Notably, the PLR node may be configured to send notifications of path quality to only those head-end nodes corresponding to the affected backup tunnels. Moreover, the PLR node may also be configured to send notifications to all head-end nodes having primary tunnels through the PLR node in response to either not being able to distinguish the corresponding primary tunnel, or to determining that a large decrease in path quality of the backup tunnels has occurred (e.g., in which case, all head-end nodes may wish to reroute their primary tunnels).

In accordance with yet another aspect of the present invention, upon receiving the error message 300 (PathErr), the head-end node may wait for at least one path quality notification (i.e., if requested) prior to determining whether to reestablish the new primary tunnel. The determination may be made based on configurable boundaries, increases, combinations, etc., of the metrics. Also, any number of metrics may be used in the determination, e.g., as configured by a system administrator. For example, using the metrics described above, a head-end node may be configured to reestablish the primary tunnel in response to i) a certain number of packet drops, ii) a percent increase in packet drops, iii) a number of packet drops and a percent increase in path cost, iv) a percent increase in path cost and a percent increase in jitter, etc. Those skilled in the art will understand that these are merely examples of possible path quality comparisons and reestablishment determinations, and that any comparisons to any metrics at any configurable changes may be used in accordance with the present invention.

Figure 6:
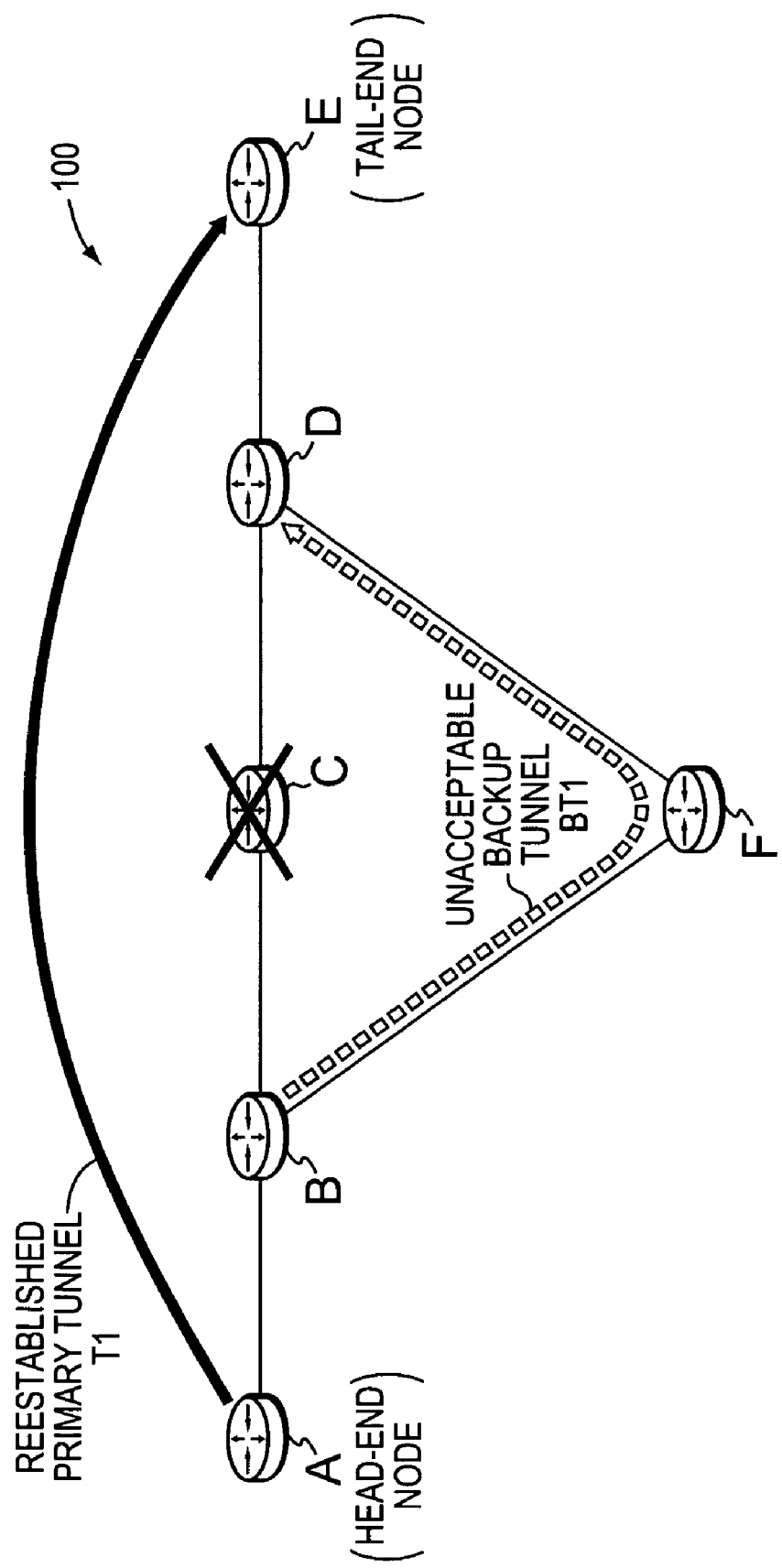
FIG. 6 is a schematic block diagram of the computer network in FIG. 5 showing an unacceptable backup tunnel path quality and resultant reestablishing of the primary tunnel in accordance with the present invention.

If the metrics are acceptable, the backup tunnel remains utilized and no primary tunnel reestablishment is performed. On the other hand, if the metrics are unacceptable, the head-end node may attempt to reestablish the new primary tunnel. FIG. 6 is a schematic block diagram of the computer network 100 in FIG. 5 showing an unacceptable backup tunnel path quality (dotted line and arrow) and resultant reestablishment of the primary tunnel in accordance with the present invention. Those skilled in the art will understand that the reestablished primary tunnel may traverse one or more primary nodes (not shown), and that it may be computed specifically to avoid the failed network element and any network elements of the unacceptable backup tunnel. Those skilled in the art will also understand that the attempt to reestablish the primary tunnel may not be able to find an acceptable path, in which case the head-end node may continue to use the unacceptable backup tunnel or other unacceptable rerouted path.

Notably, in the event the head-end node does not receive a path quality notification for the backup tunnel (e.g., within a configurable time limit), the head-end node may attempt to reestablish the new primary tunnel. For instance, there may be circumstances where the backup tunnel (e.g., network elements along the backup tunnel) may also fail or become over-congested to the point where notifications are dropped or otherwise lost. In these (and other) circumstances, then, it is important for the head-end node to decide to reestablish the primary tunnel without having received a path quality notification.

Moreover, where the head-end node has multiple primary tunnels being Fast Rerouted, a configurable subset of the primary tunnels may be reestablished, e.g., to reduce congestion of the backup tunnels. For example, only those primary tunnels with unacceptable corresponding backup tunnels may be required to be reestablished. In the event, however, the head-end node is unable to distinguish which primary tunnels are affected, it may simply reestablish all primary tunnels. Alternatively, a number of primary tunnels may be reestablished as necessary to reduce congestion and/or to increase backup tunnel path quality (e.g., one or more at a time until the backup tunnel becomes acceptable). Also, the head-end node may also limit the number of reestablished primary tunnels within a given period of time, e.g., in order to reestablish primary tunnels slowly to avoid a burst of reestablished tunnels).

Figure 7A:
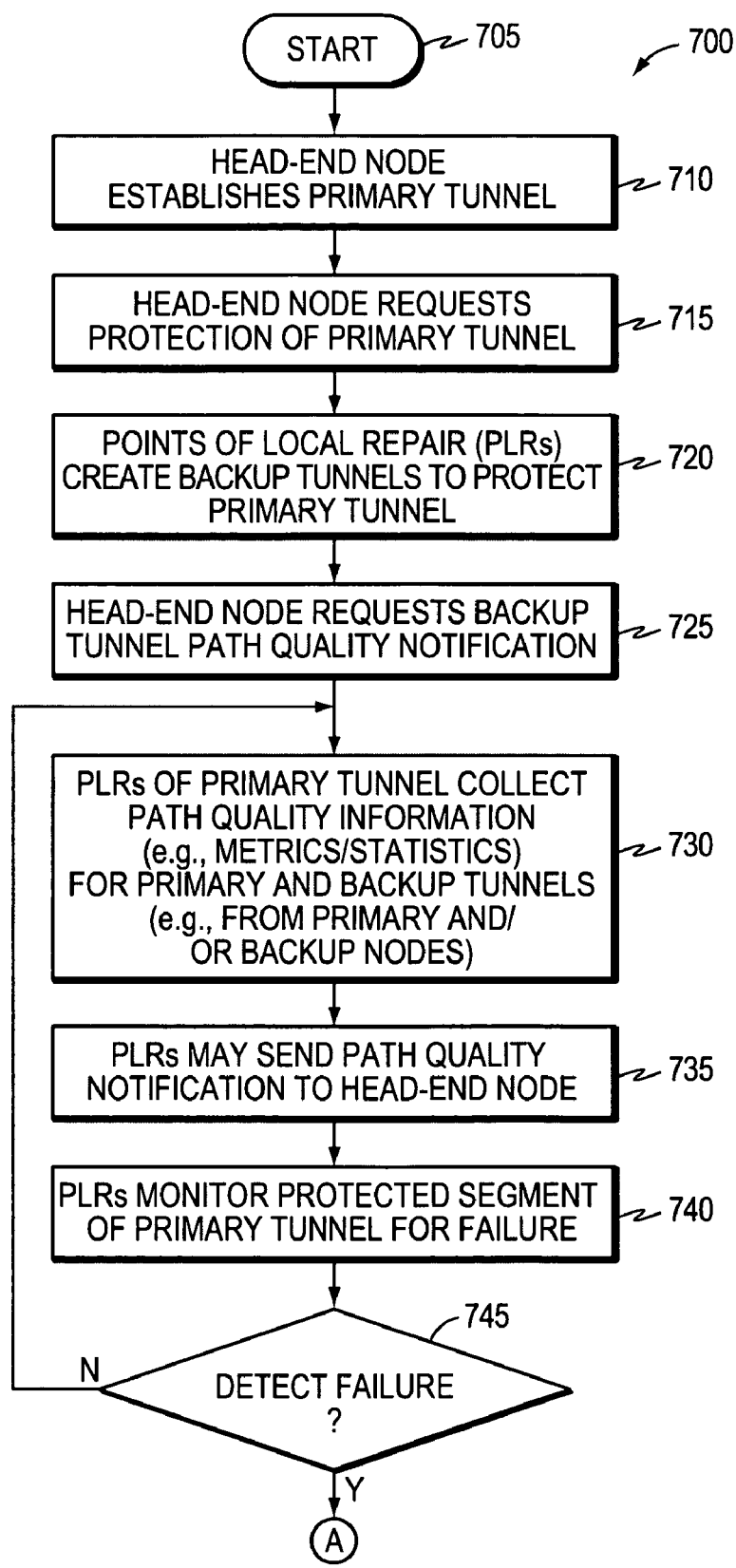
FIGS. 7A and 7B are flowcharts illustrating a procedure for dynamically determining whether to reestablish a Fast Rerouted primary tunnel based on path quality feedback of a utilized backup tunnel in accordance with the present invention.
Figure 7B:
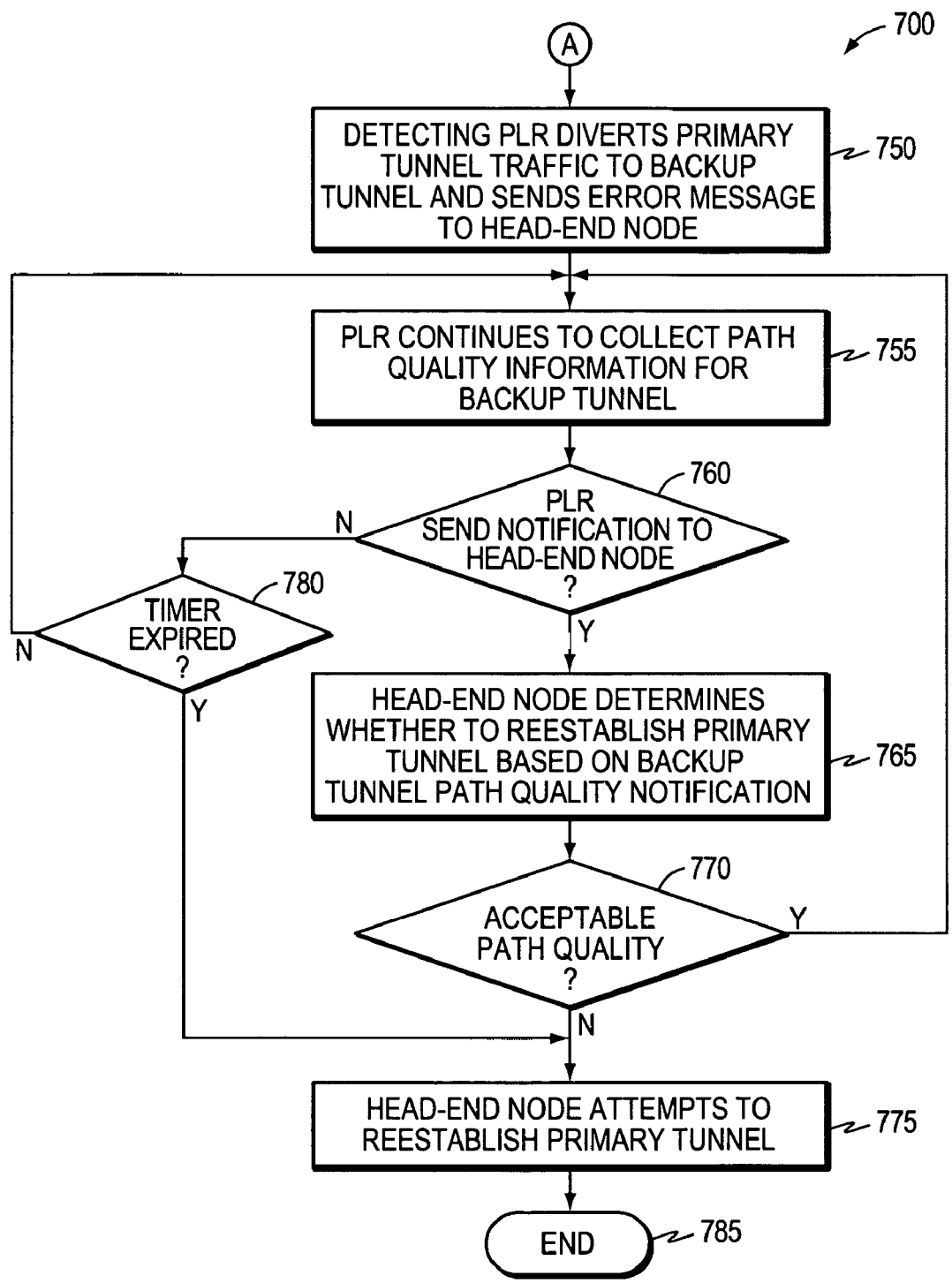

FIGS. 7A and 7B are flowcharts illustrating a procedure for dynamically determining whether to reestablish a Fast Rerouted primary tunnel based on path quality feedback of a utilized backup tunnel in accordance with the present invention. The procedure 700 starts at step 705, and continues to step 710, where a head-end node (e.g., router A) establishes a primary tunnel (e.g., T1) to a destination tail-end node (e.g., router E). During or after establishment, the head-end node requests protection of the primary tunnel at step 715, and in response, PLR nodes along the primary tunnel (e.g., router B) create backup tunnels (e.g., BT1) to protect the primary tunnel in step 720. (Those skilled in the art will understand that backup tunnels around the protected network elements may already exist at the PLR node, and that "creating backup tunnels" in step 720 implies an association with pre-existing backup tunnels.) As mentioned above, these backup tunnels may illustratively be embodied as 0-BW backup tunnels. In accordance with the present invention, the head-end node may additionally request backup tunnel path quality notification from the PLR nodes in step 725, such as, e.g., through the use of empty corresponding Feedback objects in RSVP (Path) messages 300, as described above.

Accordingly, the PLR nodes of the primary tunnel collect path quality information (e.g., metrics/statistics) for the primary and backup tunnels in step 730, such as, e.g., through cooperation with the primary and/or backup nodes, through probes or traffic monitoring, etc., as described above. If so configured, the PLR nodes may send pre Fast Reroute path quality notification to the head-end node in step 735. Otherwise, the PLR nodes simply continue to collect path quality information and monitor the respective protected segment of the primary tunnel for failure in step 740 until a failure is detected in step 745 (e.g., using connectivity verification protocols, as mentioned above).

The procedure 700 continues to FIG. 7B (step "A"), where in step 750 the PLR node detecting the failure diverts ("Fast Reroutes") the primary tunnel traffic to the backup tunnel and sends an error message (e.g., an RSVP (Error) message 300) to the head end node, e.g., a "tunnel locally repaired" message. The detecting PLR node continues to collect path quality information for the backup tunnel in step 755 and at step 760 determines whether to send the path quality notification to the head-end node. For example, as mentioned above, the PLR node may be configured to continually send notifications, or periodically, or in response to a configurable change in path quality, etc. Also as mentioned above, the PLR node may be configured to send either the actual path quality information or the change (difference) in path quality. (As further mentioned above, metrics of the backup tunnel may alternatively be collected only after Fast Reroute, and not prior to Fast Reroute.)

If the PLR node decides to send the notification in step 760, then the head-end node determines whether to reestablish the primary tunnel based on the backup tunnel path quality notification in step 765, e.g., based on one or more configurable thresholds, percentages, etc., as described above. If the backup tunnel is currently maintaining an acceptable quality for the traffic flow in step 770, the head-end node may continue to utilize the backup tunnel, and the PLR node continues to collect path quality information in step 755 to detect any change in quality. Otherwise, if the backup tunnel quality is not acceptable in step 770, the head-end node may attempt to reestablish the primary tunnel in step 775. Notably, as mentioned above, if the PLR node has not sent any notification (step 760) within a configurable period of time in step 780, e.g., due to a backup tunnel failure, over-congestion, etc., then the head-end node may also attempt to reestablish the primary tunnel in step 775 accordingly. Moreover, as described above, in the event more than one primary tunnel is Fast Rerouted for the head-end node, various techniques to reestablish one or more of the primary tunnels may be used (e.g., as many tunnels as necessary, a configurable subset of tunnels, all tunnels, the congested tunnels, etc.). The procedure 700 ends in step 785.

Advantageously, the novel technique dynamically determines whether to reestablish a Fast Rerouted primary tunnel based on path quality feedback of a utilized backup tunnel in a computer network. By providing the head-end node of the primary tunnel with path quality feedback of the backup tunnel, the novel technique avoids reestablishing a potentially large number of tunnels over one or more alternate paths after a failure (and Fast Reroute) if the backup tunnels have acceptable path quality. In particular, the backup tunnels, e.g., 0-BW backup tunnels, may not be congested or subsequently burdened by the Fast Rerouted traffic of the primary tunnel. Also, the failed network element (thus the primary tunnel) may be quickly restored; therefore by not reestablishing the primary tunnel, network jitter, churn, etc., may be avoided, as well as other control plane churn to reestablish the primary tunnel along the potentially restored path. Further, the dynamic nature of the novel technique alleviates the need for cumbersome manual configuration.

While there has been shown and described an illustrative embodiment that dynamically determines whether to reestablish a Fast Rerouted primary tunnel based on path quality feedback of a utilized backup tunnel in a computer network, it is to be understood that various other adaptations and modifications may be made within the spirit and scope of the present invention. For example, the invention has been shown and described herein using "Fast Reroute," e.g., MPLS TE Fast Reroute (FRR). However, the invention in its broader sense is not so limited, and may, in fact, be used with other network element protection and failure correction mechanisms as will be understood by those skilled in the art. Moreover, while the above description describes performing the technique at the head-end node and PLR node, the invention may also be advantageously used with PCEs. In addition, while one example of a tunnel is an MPLS TE-LSP, other known tunneling methods include, inter alia, the Layer Two Tunnel Protocol (L2TP), the Point-to-Point Tunneling Protocol (PPTP), and IP tunnels.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for dynamically determining whether to reestablish a Fast Rerouted primary tunnel based on path quality feedback of a utilized backup tunnel in a computer network, the method comprising:
    establishing a primary tunnel from a head-end node to a destination;
    establishing a backup tunnel from a point of local repair (PLR) node along the primary tunnel around one or more protected network elements of the primary tunnel;
    determining path quality for the primary tunnel, prior to detecting failure of one of the protected network elements;
    sending notification of the primary tunnel's path quality to the head-end node;
    detecting failure of one of the protected network elements;
    in response, diverting traffic received on the primary tunnel at the PLR node onto the established backup tunnel;
    determining path quality for the established backup tunnel, after diverting traffic onto the backup tunnel;
    sending notification of the established backup tunnel's path quality from the PLR node to the head-end node; and
    determining, at the head-end node, whether to reestablish the primary tunnel in response to a difference in path quality between the path quality of the established backup tunnel and the path quality for the primary tunnel.

2. The method as claim 1, further comprising:
    sending the notification of the established backup tunnel's path quality from the PLR node to the head-end node through a signaling exchange.

3. The method as claim 2, further comprising:
    sending the notification of the established backup tunnel's path quality in a sub-object of an LSP-ATTRIBUTE object of a Resource ReSerVation Protocol (RSVP) signaling exchange message.

4. The method as claim 2, further comprising:
    sending the notification of the established backup tunnel's path quality with each metric of path quality within a corresponding object of messages of the signaling exchange.

5. The method as claim 2, further comprising:
    requesting, by the head-end node, notification of the established backup tunnel's path quality from the PLR node through empty path quality objects of messages of the signaling exchange.

6. The method as claim 1, further comprising:
    requesting, by the head-end node, notification of the established backup tunnel's path quality from the PLR node.

7. The method as claim 6, further comprising:
    establishing the backup tunnel as a zero-bandwidth (0-BW) tunnel.

8. The method as claim 1, further comprising:
    sending an error message from the PLR node to the head-end node in response to detecting the failure of the network element.

9. The method as claim 8, further comprising:
    waiting to receive a path quality notification after receiving the error message at the head-end node prior to making the determination whether to reestablish.

10. The method as claim 9, further comprising:
    in response to expiration of a configurable timer after receiving the error message at the head-end node prior to receiving a path quality notification, reestablishing the primary tunnel.

11. The method as claim 1, further comprising determining path quality for the primary tunnel and determining path quality for the backup tunnel by collecting path quality information at the PLR node.

12. The method as claim 11, further comprising:
    collecting path quality information of the primary tunnel prior to detecting failure of the protected network element.

13. The method as claim 11, further comprising:
    collecting path quality information of the backup tunnel prior to detecting failure of the protected network element and after diverting traffic onto the backup tunnel.

14. The method as claim 11, further comprising:
    collecting path quality information using techniques selected from a group comprising: traffic monitoring, probes, cooperation with other nodes along the tunnels, and internal computations.

15. The method as claim 11, further comprising:
    collecting path quality information selected from a group comprising: packet drop, jitter, cost, bandwidth, and delay.

16. The method as claim 1, further comprising:
    sending the notification of the established backup tunnel's path quality from the PLR node to the head-end node in response to a configurable change in path quality of the backup tunnel.

17. The method as claim 1, further comprising:
    sending with the notification of the established backup tunnel's path quality an indication of which primary tunnel corresponds to the established backup tunnel of the notification in the event there are more than one established primary tunnels.

18. The method as claim 1, further comprising:
    sending the notification of the established backup tunnel's path quality from the PLR node to a plurality of head-end nodes having established primary tunnels for which the PLR node is diverting traffic.

19. The method as claim 18, further comprising:
sending the notification of the established backup tunnel's path quality from the PLR node to all of the plurality of head-end nodes in response to having no identification of which head-end node corresponds to the established backup tunnel of the notification.

20. The method as claim 18, further comprising:
sending the notification of the established backup tunnel's path quality from the PLR node to one of the plurality of head-end nodes in response to that head-end node corresponding to the established backup tunnel of the notification.

21. The method as claim 1, wherein the difference in path quality is evaluated according to one or more configurable factors selected from a group comprising: boundaries, increases, decreases, and percentages.

22. The method as claim 1, further comprising:
determining to one of a) reestablish the primary tunnel if the difference in path quality between the path quality of the established backup and the path quality for the primary tunnel exceeds a configurable threshold and b) continue to utilize the established backup tunnel if the difference in path quality between the path quality of the established backup tunnel and the path quality for the primary tunnel does not exceed the configurable threshold.

23. The method as claim 1, further comprising:
in the event the head-end node has a plurality of primary tunnels, determining which primary tunnels to reestablish.

24. The method as claim 23, further comprising:
determining which primary tunnels to reestablish based on one or more determination configurations selected from a group consisting of: a configurable subset of the plurality of primary tunnels, primary tunnels corresponding to the established backup tunnel's path quality notification, a sufficient number of primary tunnels required to increase the established backup tunnel's path quality to an acceptable level, and a configurable number of primary tunnels.

25. The method as claim 1, further comprising:
establishing primary and backup tunnels as tunnels selected from a group consisting of: Multiprotocol Label Switching (MPLS) Traffic Engineering (TE) Label Switched Paths (LSPs), Layer Two Tunnel Protocol (L2TP) tunnels, Point-to-Point Tunneling Protocol (PPTP) tunnels, and IP tunnels.

26. An apparatus for dynamically determining whether to reestablish a Fast Rerouted primary tunnel based on path quality feedback of a utilized backup tunnel in a computer network, the apparatus comprising:
means for establishing a primary tunnel from a head-end node to a destination;
means for establishing a backup tunnel from a point of local repair (PLR) node along the primary tunnel around one or more protected network elements of the primary tunnel;
means for determining path quality for the primary tunnel, prior to detection of failure of one of the protected network elements;
means for sending notification of the primary tunnel's path quality to the head-end node;
means for detecting failure of one of the protected network elements;
means for diverting traffic received on the primary tunnel at the PLR node onto the established backup tunnel, in response to detection of the failure of one of the protected network elements;
means for determining path quality for the established backup tunnel, after diversion of traffic onto the backup tunnel;
means for sending notification of the established backup tunnel's path quality from the PLR node to the head-end node; and
means for determining, at the head-end node, whether to reestablish the primary tunnel in response to a difference in path quality between the path quality of the established backup tunnel and the path quality for the primary tunnel.

27. A system for dynamically determining whether to reestablish a Fast Rerouted primary tunnel based on path quality feedback of a utilized backup tunnel in a computer network, the system comprising:
a head-end node configured to establish a primary tunnel to a destination;
one or more protected network elements of the primary tunnel;
a point of local repair (PLR) node along the primary tunnel configured to: i) establish a backup tunnel around the protected network elements, ii) determine path quality for the primary tunnel, prior to detection of failure of one of the protected network elements, iii) send notification of the primary tunnel's path quality to the head-end node, iv) detect failure of one of the protected network elements, v) in response, divert traffic received on the primary tunnel at the PLR node onto the established backup tunnel, vi) determine path quality for the backup tunnel, after diversion of traffic onto the backup tunnel, vii) send notification of the established backup tunnel's path quality from the PLR node to the head-end node; and
wherein the head-end node is further configured to determine whether to reestablish the primary tunnel in response to a difference in path quality between the path quality of the established backup tunnel and the path quality for the primary tunnel that existed prior to the failure of the one of the protected network elements.

28. A point of local repair (PLR) node for use with dynamically determining whether to reestablish a Fast Rerouted primary tunnel based on path quality feedback of a utilized backup tunnel in a computer network, the PLR node comprising:
one or more network interfaces;
a processor coupled to the one or more network interfaces and configured to execute software processes; and
a memory configured to store a TE process executable by the processor, the TE process configured to: i) establish a primary tunnel to a destination in response to a request from a head-end node, ii) establish a backup tunnel around one or more protected network elements of the primary tunnel, iii) determine path quality for the primary tunnel prior to detection of failure of one of the protected network elements, iv) send notification of the primary tunnel's path quality to the head-end node, v) detect failure of one of the protected network elements, vi) in response, divert traffic received on the primary tunnel onto the established backup tunnel, vii) determine path quality for the established backup tunnel, and viii) send notification of the established backup tunnel's path quality to the head-end node.

29. A head-end node for use with dynamically determining whether to reestablish a Fast Rerouted primary tunnel based on path quality feedback of a utilized backup tunnel in a computer network, the head-end node comprising:
one or more network interfaces;
a processor coupled to the one or more network interfaces and configured to execute software processes; and
a memory configured to store a TE process executable by the processor, the TE process configured to: i) establish a primary tunnel from the head-end node to a destination, ii) request protection of one or more protected network elements of the primary tunnel by one or more point of local repair (PLR) nodes, iii) receive notification of the primary tunnel's path quality at the head-end node, the primary tunnel's path quality determined prior to failure of one of the protected network elements, iv) receive notification of failure of the primary tunnel from one of the PLR nodes, v) receive notification of an established backup tunnel's path quality from that PLR node at the head-end node, and vi) determine, at the head-end node, whether to reestablish the primary tunnel in response to a difference in path quality between the path quality of the established backup tunnel and the path quality for the primary tunnel prior to failure of one of the protected network elements.

30. The head-end node of claim 29, the TE process further configured to receive notification of the established backup tunnel's path quality in a sub-object of an LSP-ATTRIBUTE object of a Resource ReSerVation Protocol (RSVP) signaling exchange message.

31. The head-end node of claim 30, the TE process further configured to receive notification of the established backup tunnel's path quality within a corresponding object of messages of the signaling exchange.

32. The head-end node of claim 29, the TE process further configured to request notification of the established backup tunnel's path quality from one of the PLR nodes.

33. The head-end node of claim 32, the TE process further configured to request notification of the established backup tunnel's path quality from one of the PLR nodes through empty path quality objects of messages of the signaling exchange.

34. The head-end node of claim 29, wherein the established backup tunnel is initially a zero-bandwidth (0-BW) tunnel.

35. The head-end node of claim 29, the TE process further configured to receive an error message from one of the PLR nodes in response to detection of the failure of the network element.

36. A method comprising:
establishing a primary tunnel from a head end node to a destination;
requesting protection of one or more protected network elements of the primary tunnel by one or more point of local repair (PLR) nodes;
receiving notification of the primary tunnel's path quality at the head-end node, the primary tunnel's path quality determined prior to failure of one of the protected network elements;
receiving notification of failure of the primary tunnel from one of the PLR nodes;
receiving notification of an established backup tunnel's path quality from the one of the PLR nodes at the head-end node; and
determining, at the head-end node, whether to reestablish the primary tunnel in response to a difference in path quality between the path quality of the established backup tunnel and the path quality for the primary tunnel prior to failure of one of the protected network elements.

* * * * *

UNITED STATES PATENT AND TRADEMARK OFFICE
CERTIFICATE OF CORRECTION

PATENT NO. : 8,072,879 B2
APPLICATION NO. : 11/347781
DATED : December 6, 2011
INVENTOR(S) : Vasseur et al.

It is certified that error appears in the above-identified patent and that said Letters Patent is hereby corrected as shown below:

Col. 2, line 61: "MPLS Traffic Engineering exploits ~~modem~~ modern label switching"

Signed and Sealed this
Seventeenth Day of April, 2012

David J. Kappos
*Director of the United States Patent and Trademark Office*